United States Patent
Sato

(10) Patent No.: US 9,137,393 B2
(45) Date of Patent: Sep. 15, 2015

(54) IMAGE PROCESSING APPARATUS, METHOD AND NON-TRANSITORY COMPUTER-READABLE STORAGE MEDIUM FOR EXECUTING WORKFLOW USING PRIORITY INFORMATION

(75) Inventor: Masaaki Sato, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 694 days.

(21) Appl. No.: 13/119,067

(22) PCT Filed: Jan. 12, 2011

(86) PCT No.: PCT/JP2011/050794
§ 371 (c)(1),
(2), (4) Date: Mar. 15, 2011

(87) PCT Pub. No.: WO2011/087138
PCT Pub. Date: Jul. 21, 2011

(65) Prior Publication Data
US 2011/0211227 A1    Sep. 1, 2011

(30) Foreign Application Priority Data

Jan. 14, 2010 (JP) .................. 2010-006229
Dec. 27, 2010 (JP) .................. 2010-291131

(51) Int. Cl.
*H04N 1/00* (2006.01)
*G06F 3/12* (2006.01)

(52) U.S. Cl.
CPC ....... *H04N 1/00209* (2013.01); *H04N 1/00915* (2013.01); *H04N 1/00949* (2013.01); *H04N 1/00952* (2013.01); *H04N 1/00954* (2013.01); *H04N 1/00957* (2013.01); *G06F 3/1204* (2013.01); *G06F 3/1275* (2013.01); *G06F 3/1285* (2013.01); *H04N 2201/3202* (2013.01)

(58) Field of Classification Search
USPC ...................................... 358/1.15
See application file for complete search history.

(56) References Cited

U.S. PATENT DOCUMENTS

2005/0097232 A1* 5/2005 Sasaki et al. ............... 710/8
2009/0019271 A1* 1/2009 Kawakami ............... 712/227
2009/0051962 A1* 2/2009 Asai et al. ............... 358/1.15

FOREIGN PATENT DOCUMENTS

| JP | 2002-270148 A | 9/2002 |
| JP | 2007-166175 A | 6/2007 |
| JP | 2008-193664 A | 8/2008 |
| JP | 2009-031850 A | 2/2009 |

* cited by examiner

*Primary Examiner* — Benny Q Tieu
*Assistant Examiner* — Haris Sabah
(74) *Attorney, Agent, or Firm* — Carter, DeLuca, Farrell & Schmidt, LLP

(57) ABSTRACT

The present invention provides an image processing apparatus that executes process according to a job flow in which cooperation process in a plurality of apparatuses is defined, and that, when a function has been added that is equivalent to process that has been defined in the job flow, can utilize the equivalent added function in the job flow without a user manually re-editing the job flow. The present invention also provides a method for controlling such an image processing apparatus. To accomplish this, the present image processing apparatus, in a job flow in which a plurality of processes are executed cooperatively by a plurality of apparatuses, executes the job flow in an optimized manner using priority information that indicates the priority of apparatuses that execute each process, and mount function information that indicates the function mounted by each apparatus.

7 Claims, 13 Drawing Sheets

FIG. 7

<SCAN SET VALUE INFORMATION>

| SET VALUE INFORMATION | MFP101 | CLIENT COMPUTER 105 |
|---|---|---|
| COLOR 600 × 600 | 1 | 2 |
| COLOR 200 × 200 | 2 | 1 |
| MONOCHROME BINARY 600 × 600 | 1 | 2 |
| MONOCHROME BINARY 200 × 200 | 2 | 1 |

FIG. 8

<MOUNT FUNCTION MANAGEMENT TABLE> 800

| FUNCTION TYPE | MFP101 | CLIENT COMPUTER 105 |
|---|---|---|
| OCR (CHARACTER RECOGNITION) | ○ | ○ |
| OCR (FORM RECOGNITION) | × | ○ |
| FILE SERVER SEND | ○ | ○ |

F I G. 10

<LOG INFORMATION>

1100

| JOB FLOW ID | EXECUTION JOB | JOB SET VALUE | APPARATUS ID | DATE | USER |
|---|---|---|---|---|---|
| ZZZ | SCAN JOB | 600 × 600 DPI COLOR | MFP101 : AAA | 2009 / 8 / 31 | BBB |
| ZZZ | EXECUTE OCR (CHARACTER RECOGNITION) | LOW | MFP101 : AAA | 2009 / 8 / 31 | BBB |
| ZZZ | SEND TO FILE SERVER | SEND DESTINATION SERVER : DDD | MFP101 : AAA | 2009 / 8 / 31 | BBB |

IMAGE PROCESSING APPARATUS, METHOD AND NON-TRANSITORY COMPUTER-READABLE STORAGE MEDIUM FOR EXECUTING WORKFLOW USING PRIORITY INFORMATION

TECHNICAL FIELD

The present invention relates to an image processing apparatus, a processing method thereof, and a computer-readable storage medium.

BACKGROUND ART

MFPs (Multi-Function Peripherals) are known in which functions of an image forming apparatus such as a printer function, a copier function, and a facsimile function are combined. In an MFP, by combining a plurality of functions, a function of executing a plurality of processing steps to be executed by the MFP as a single job is implemented in order to simplify the work of a user in an office.

The plurality of processes are provided depending on the work of the user. Accordingly, because various forms of work are assumed, it is necessary to provide an arbitrary combination of processing steps (referred to below as a job flow). In a job-flow of processing that can be performed in the MFP, it is possible to designate processing for a combination of a scan function, an image processing function of extracting characters from an image, a function of sending data obtained by scanning to an external system, and so forth. For example, Japanese Patent Laid-Open No. 2002-270148 proposes a job flow in which designation can be made such that the scan function is processed by the MFP, and the image processing function and the function of sending to an external system are processed by a client computer. Thus, by the user executing process according to the job flow, it is possible to execute process performed in cooperation among a plurality of apparatuses, and so it is possible to improve work efficiency.

However, with the above conventional technology, there are the following problems. For example, with the above conventional technology, a job flow created such that the image processing function and the function of sending to an external system are executed in a client computer is stored in advance in the MFP. On the other hand, in the MFP, it is ordinarily possible to add functions, and for example, it is possible to add functions equivalent to the image processing function and the sending function. However, in order to enable execution of the added equivalent function in the job flow that has been stored in advance, it is necessary for the user to manually re-edit the job flow.

SUMMARY OF INVENTION

The present invention enables realization of an image processing apparatus in which, along with executing process according to a job flow in which cooperative process among a plurality of apparatuses has been defined, when a function equivalent to process defined in the job flow has been added, the added equivalent function can be utilized in the job flow without a user manually re-editing the job flow. The present invention also enables realization of a method to control this image processing apparatus.

One aspect of the present invention provides an image processing apparatus that is connected to an external apparatus, and executes process according to a job flow in which a plurality of processes in cooperation with the external apparatus have been defined, the image processing apparatus comprising: analyzing means for analyzing each process that has been defined in the job flow to be executed; obtaining means for obtaining, from priority information storing means for storing in advance priority information that indicates a priority for the apparatus that executes each process, the priority information for each process that has been analyzed by the analyzing means, and obtaining, from a mount function storing means for storing in advance mount function information that indicates functions that the image processing apparatus and the external apparatus have, the mount function information for each process that has been analyzed by the analyzing means; and generating means for, when at least one of the processes that have been analyzed is to be executed with priority by the image processing apparatus, and the image processing apparatus has a function for executing that process, if that process is defined in the job flow so as to be executed by the external apparatus, generating a job flow changed so that that process is executed by the image processing apparatus.

Another aspect of the present invention provides an image processing apparatus that is connected to an external apparatus, and executes process according to a scan job flow in which a plurality of processes in cooperation with the external apparatus have been defined, the image processing apparatus comprising: scan processing means for generating scan data by executing a scan process according to each process that has been defined in the scan job flow to be executed; determining means for determining whether or not the image processing apparatus can execute a process to be executed by the external apparatus among each process that has been defined in the scan job flow to be executed; executing means for executing the process to be executed in the external apparatus for the scan data when the determining means have been determined that the image processing apparatus can execute a process to be executed in the external apparatus; and generating means for generating a new scan job flow so that the external apparatus does not execute a process that have been executed by the executing means among each process that has been defined in the scan job flow to be executed.

Still another aspect of the present invention provides a method for controlling an image processing apparatus that is connected to an external apparatus, and executes process according to a job flow in which a plurality of processes in cooperation with the external apparatus have been defined, the method comprising: analyzing, in analyzing means, each process that has been defined in the job flow to be executed; obtaining, in obtaining means, from priority information storing means for storing in advance priority information that indicates a priority for the apparatus that executes each process, the priority information for each process that has been analyzed in the analyzing step, and obtaining, from mount function storing means for storing in advance mount function information that indicates functions that the image processing apparatus and the external apparatus have, the mount function information for each process that has been analyzed in the analyzing step; and when at least one of the processes that have been analyzed is to be executed with priority by the image processing apparatus, and the image processing apparatus has a function for executing that process, if that process is defined in the job flow so as to be executed by the external apparatus, generating, in generating means, a job flow changed so that that process is executed by the image processing apparatus.

Still yet another aspect of the present invention provides a method for controlling an image processing apparatus that is connected to an external apparatus, and executes process according to a scan job flow in which a plurality of processes in cooperation with the external apparatus have been defined, the method comprising: generating, in scan processing means, scan data by executing a scan process according to each process that has been defined in the scan job flow to be executed; determining, in determining means, whether or not the image processing apparatus can execute a process to be executed by the external apparatus among each process that has been defined in the scan job flow to be executed; executing, in executing means, the process to be executed in the external apparatus for the scan data when the determining means have been determined that the image processing apparatus can execute a process to be executed in the external apparatus; and generating, in generating means, a new scan job flow so that the external apparatus does not execute a process that have been executed by the executing means among each process that has been defined in the scan job flow to be executed.

Yet still another aspect of the present invention provides a computer-readable storage medium storing a computer program for causing a computer to execute the method for controlling the image processing apparatus.

Further features and aspects of the present invention will be apparent from the following description of exemplary embodiments with reference to the attached drawings.

BRIEF DESCRIPTION OF DRAWINGS

FIG. 7 shows an example of scan set value information according to the first embodiment.

FIG. 8 shows an example of mount function management information 800 according to the first embodiment.

FIG. 10 shows an example of log information 1100 according to the first embodiment.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Processing System

Figure 1:
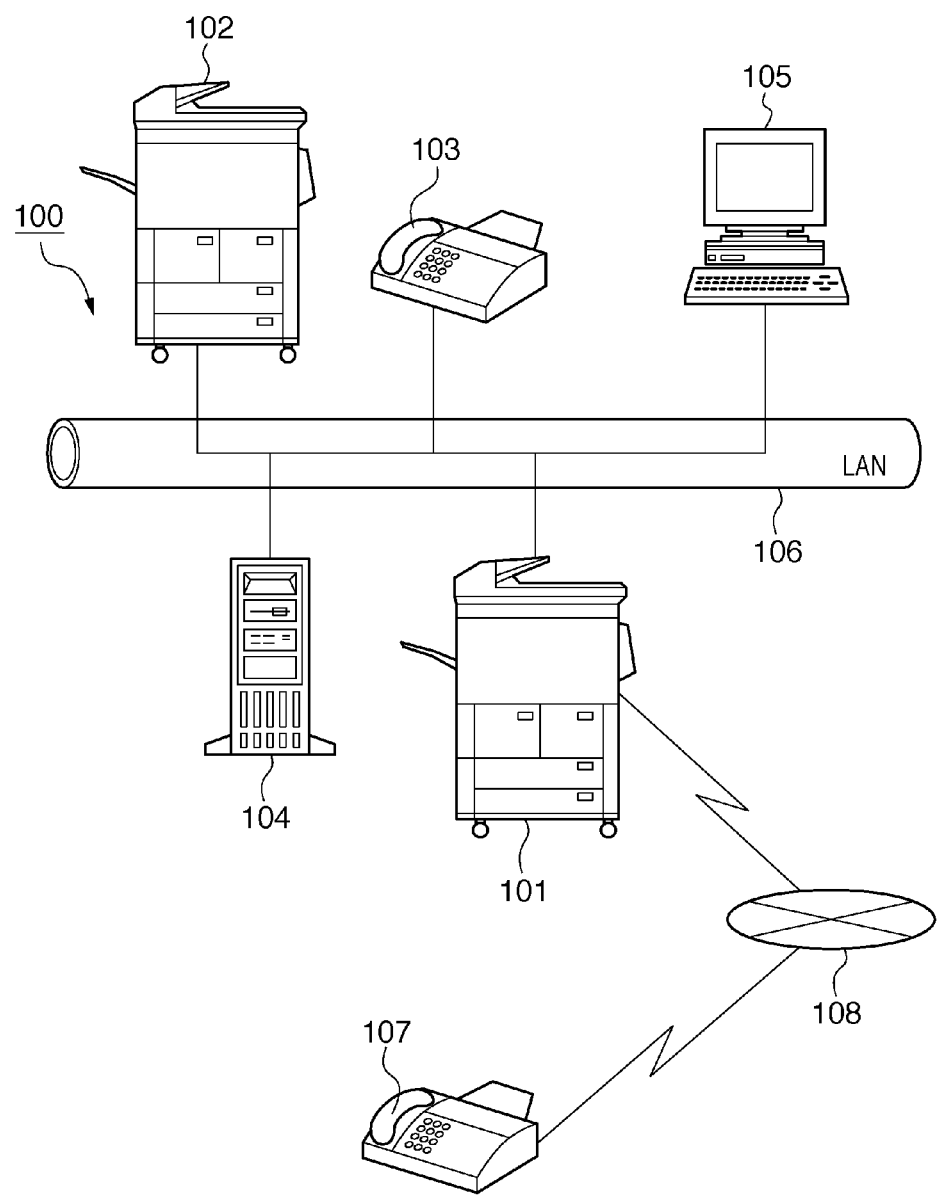
FIG. 1 shows an example configuration of an image processing system 100 according to the present invention.

First, an image processing system according to the present invention will be described with reference to FIG. 1. An image processing system 100 includes MFPs 101 and 102, facsimile apparatuses 103 and 107, a database/mail server 104, and a client computer 105. As shown in FIG. 1, the MFPs 101 and 102, the facsimile apparatus 103, the database/mail server 104, and the client computer 105 are connected via a LAN 106 constituted from Ethernet (registered trademark) or the like, so as to be capable of communicating with each other. The facsimile apparatus 107 is connected to the MFP 101 via a public communications line (WAN) 108. In the description below, it is assumed that the MFP 101 functions as an image processing apparatus, and another apparatus included in the image processing system 100 functions as an external apparatus. However, the image processing apparatus of the present invention is not limited to only an MFP, and can also be embodied by another device such as a scanner.

The MFP 101 is an image processing apparatus that in addition to having a copy function and a facsimile function, also has a data sending function of reading an original image and sending the image data obtained by reading to each apparatus on the LAN 106. Also, the MFP 101 has a PDL (Page Description Language) function, and therefore is capable of receiving an instructed PDL image from a connected computer on the LAN 106 and printing the received PDL image. The MFP 101 is capable of saving an image read from an original or a PDL image received from a connected computer on the LAN 106 to a designated box area of a hard disk (HDD) 204 described later. Also, the MFP 101 can print an image that has, been saved in the box area. The MFP 101 can receives data read by the MFP 102 via the LAN 106, and save the received data in the HDD 204, output the received data by printing, and so forth. Furthermore, the MFP 101 can receive an image from the database/mail server 104 via the client computer 105 and the LAN 106, and save the received image in the HDD 204, output the received image by printing, and so forth.

The facsimile apparatus 103 can receive data read by the MFP 101 via the LAN 106, and send the received data. The database/mail server 104 is a server apparatus that has a function of receiving data read by the MFP 101 via the LAN 106, storing the received data in a database, and sending the received data as electronic mail. The client computer 105, by being connected to the database/mail server 104, can obtain desired data from the database/mail server 104 and display the obtained data. The client computer 105 can receive data read by the MFP 101 via the LAN 106, and process and edit the received data. The facsimile apparatus 107 can receive data read by the MFP 101 via the public communications line 108, and output the received data by printing.

Configuration of Image Processing Apparatus

Figure 2:
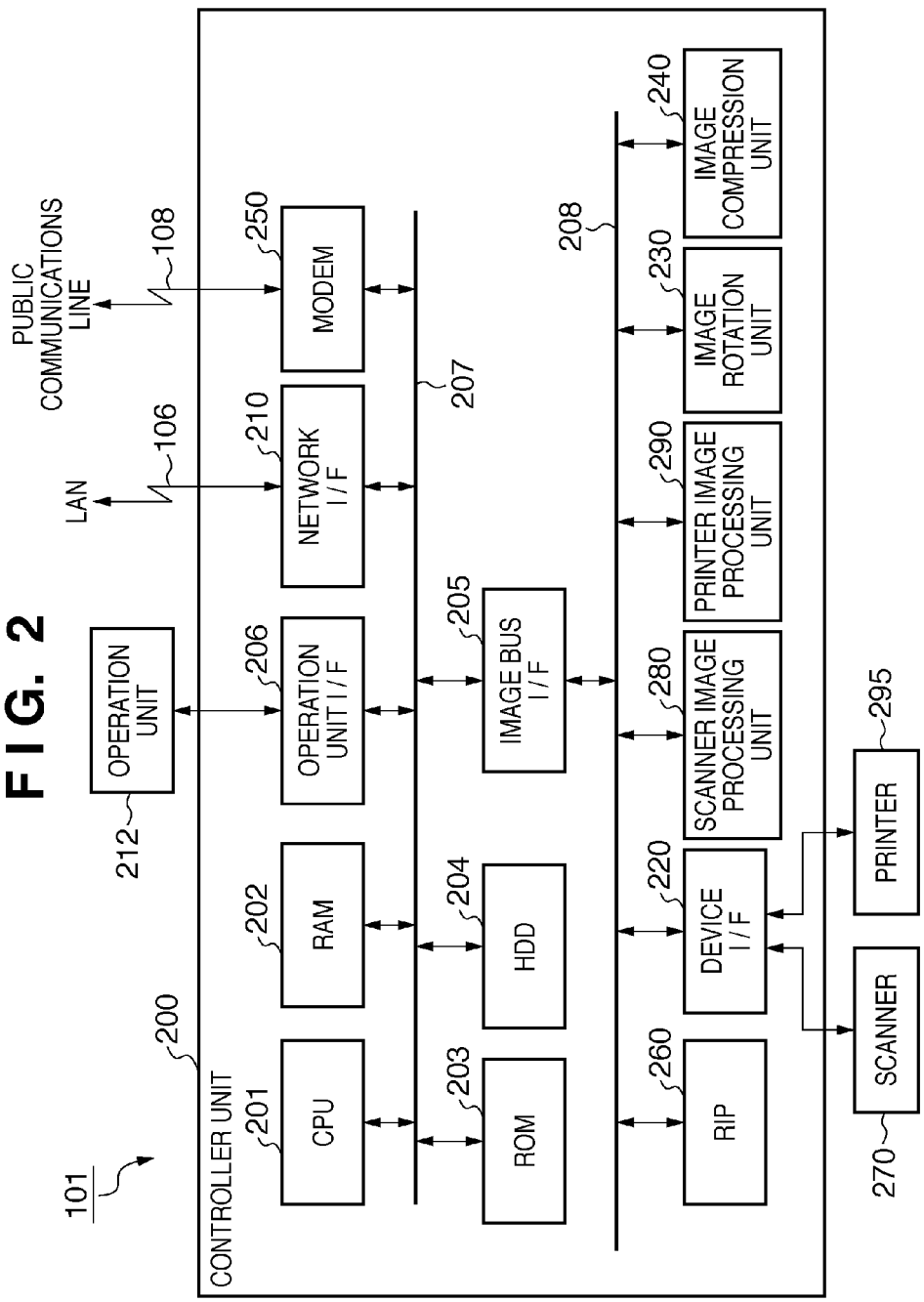
FIG. 2 is a block diagram that shows an example configuration of an MFP 101 according to the present invention.

Next is a description of the main aspects of an example configuration of the MFP 101 that is an image processing apparatus, with reference to FIG. 2. The MFP 101 includes a controller unit 200 that performs central control of process of the MFP 101. Connected to the controller unit 200 are a scanner 270 that is an image input device and a printer 295 that is an image output device, and an operation unit 212. The controller unit 200 performs control for realizing a copy function that performs printing output by the printer 295 of image data that has been read by the scanner 270. Also, the controller unit 200 performs control for performing input/output of image information and device information by connecting to the LAN 106 or the public communications line 108.

The controller unit 200 is provided with a CPU 201. The CPU 201 starts up an operating system (OS) using a boot program stored in a ROM 203. Further, the CPU 201, on the OS, executes application programs stored in the HDD 204, thus executing various processes. A RAM 202 is used as a work area of the CPU 201. The RAM 202 provides a work area, and also provides an image memory area for temporarily storing image data. The HDD 204 stores the above application programs, image data, and so forth.

The ROM 203, the RAM 202, an operation unit I/F (operation unit interface) 206, and a network I/F (network interface) 210 are connected to the CPU 201 via a system bus 207. Also, a modem 250 and an image bus I/F (image bus interface) 205 are connected to the CPU 201. The operation unit I/F 206 is an interface with the operation unit 212 having a touch panel, and outputs image data to be displayed in the operation unit 212 to the operation unit 212. Also, the operation unit I/F 206 forwards information that has been input by a user in the operation unit 212 to the CPU 201.

The network I/F 210 is connected to the LAN 106, and performs input/output of information among apparatuses in the image processing system 100 via the LAN 106. The modem 250 is connected to the public communications line 108, and performs input/output of information via the public communications line 108. The image bus I/F 205 is connected to the system bus 207, and an image bus 208 that performs high-speed transfer of image data, and is a bus bridge for converting the data format. The image bus 208 is configured with a PCI bus or IEEE 1394 bus. Provided on the image bus 208 are a raster image processor (referred to below as a "RIP") 260, a device I/F 220, a scanner image processing unit 280, a printer image processing unit 290, an image rotation unit 230, and an image compression unit 240.

The RIP 260 is a processor that converts PDL code into a bitmap image. The scanner 270 and the printer 295 are connected to the device I/F 220. The device I/F 220 performs conversion between a synchronous system/asynchronous system for image data. The scanner image processing unit 280 performs correction, processing, and editing on input image data. The printer image processing unit 290 performs correction, resolution conversion, and the like corresponding to the printer 295 on image data to be output by printing. The image rotation unit 230 performs rotation of image data. The image compression unit 240 compresses multilevel image data into JPEG data, compresses binary image data into JBIG data, MMR data, MH data, or the like, and also performs decompression of such compressed data.

Figure 3:
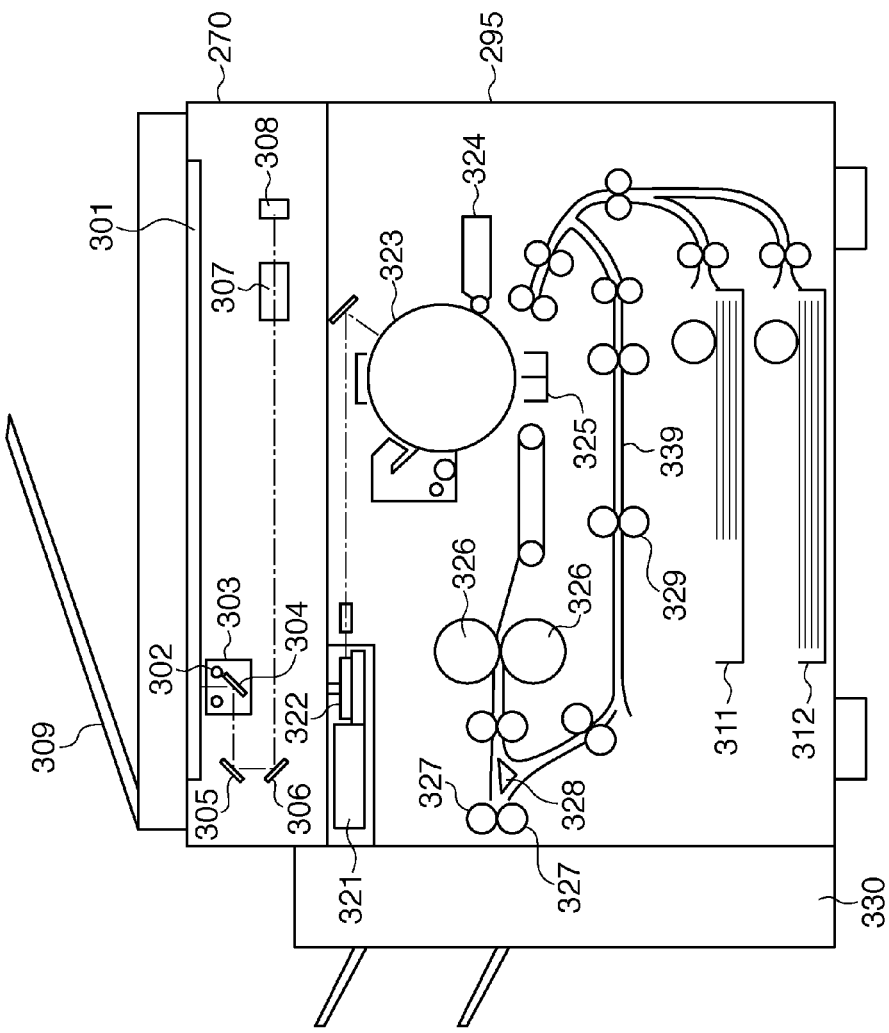
FIG. 3 is a cross-sectional view that shows a hardware configuration of a scanner and a printer according to the present invention.

Next is a description of the hardware configuration of the scanner 270 and the printer 295, with reference to FIG. 3. As shown in FIG. 3, the scanner 270 and the printer 295 are configured as a single body. In the scanner 270, an original feed unit 309 is mounted. The original feed unit 309 feeds an original from the beginning in order page-by-page onto a glass platen 301, and each time that a reading operation of respective originals finishes, discharges that original from the glass platen 301 to a discharge tray. When an original is fed onto the glass platen 301, the scanner 270 lights a lamp 302, and starts movement of a moving unit 303. By movement of the moving unit 303, read scanning is performed for the original on the glass platen 301. During this read scanning, reflected light from the original is guided to a CCD image sensor (referred to below as a "CCD") via respective mirrors 304, 305, and 306 and a lens 307, and an image on the original is formed on an image capture face of the CCD 308. The CCD 308 converts the image formed on the image capture face to an electrical signal, and after predetermined process is performed on the electrical signal, the signal is input to the controller unit 200.

The printer 295 has a laser driver 321. The laser driver 321 drives a laser emission unit 322 based on image data that has been input from the controller unit 200. Thus, laser light corresponding to the image data is emitted from the laser emission unit 322. The laser light is irradiated onto a photosensitive drum 323 while scanning. An electrostatic latent image is formed on the photosensitive drum 323 by the irradiated laser light. The formed electrostatic latent image is made visible as a toner image using toner supplied from a development unit 324. In synchronization with the timing of irradiation of the laser light, printing paper is supplied between the photosensitive drum 323 and a transfer unit 325 from respective cassettes 311 and 312 via a transport path, and the toner image on the photosensitive drum 323 is transferred onto the supplied printing paper by the transfer unit 325.

The printing paper on which the toner image has been transferred is fed to a fixing roller pair (a heat roller and a pressure roller) 326 via a transport belt, and the fixing roller pair 326 applies heat and pressure to the printing paper to fix the toner image on the printing paper onto the printing paper. After passing through the fixing roller pair 326, the printing paper is discharged to a discharge unit 330 by a discharge roller pair 327. The discharge unit 330 is configured with a sheet processing apparatus capable of performing post-process such as sorting or stapling.

When a duplex recording mode has been set, after the printing paper is transported to the discharge roller pair 327, the rotation direction of the discharge roller pair 327 is reversed, so that the printing paper is guided to a re-feed transport path 339 by a flapper 328. After being guided to the re-feed transport path 339, the printing paper is re-fed between the photosensitive drum 323 and the transfer unit 325 at the above-described timing, and a toner image is transferred to the back face of the printing paper.

Figure 4:
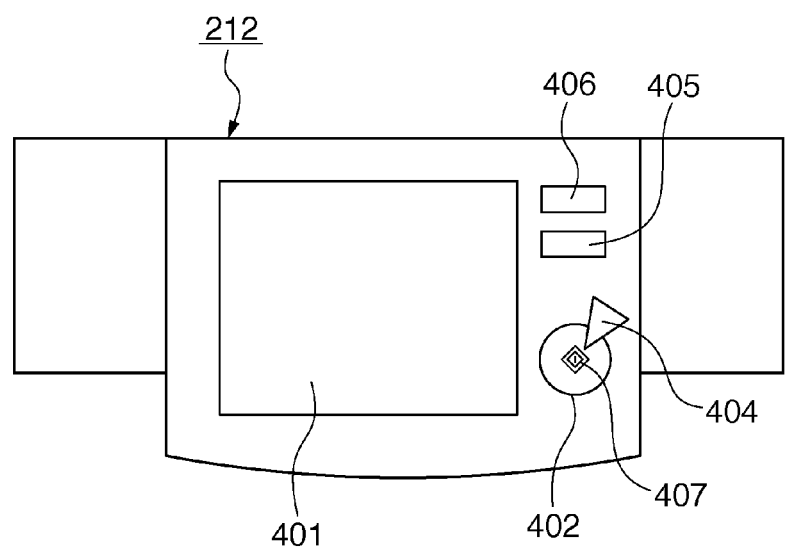
FIG. 4 is a plan view that shows an example configuration of an operation unit 212 according to the present invention.

Next is a description of the operation unit 212 with reference to FIG. 4. An LCD display unit 401 has a construction in which a touch panel sheet is affixed on an LCD, and along with displaying an operation screen of the MFP 101, when a key displayed on the operation screen is pressed, transmits position information of the key to the CPU 201 of the controller unit 200. A start key 402 is used, for example, when starting an operation to read an original image. A two-color LED 407 of green and red is provided in the center of the start key 402, and whether or not the start key 402 is in a usable state is indicated by the color of the two-color LED 407. A stop key 404 is operated when stopping an operation in progress. An ID key 405 is used when inputting a user ID of a user. A reset key 406 is used when initializing settings from the operation unit 212.

Figure 5:
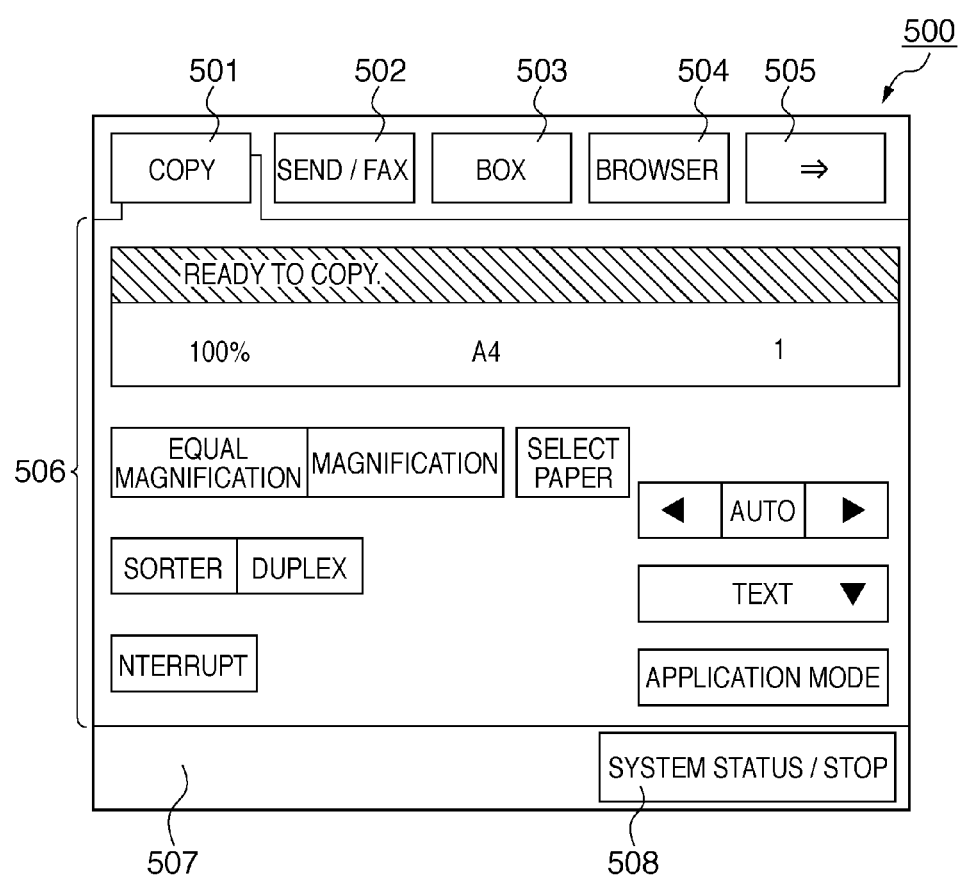
FIG. 5 shows an example of an operation screen 500 displayed in the operation unit 212 according to the present invention.

Next is a description of an example of an operation screen 500 displayed in the operation unit 212, with reference to FIG. 5. In the upper portion of the operation screen 500 of the operation unit 212 are displayed a copy tab 501, a send/FAX tab 502, a box tab 503, a browser tab 504, and a right arrow tab 505 for selecting various functions, configured with touch keys. When these tabs 501 to 504 are pressed, an initial screen of the corresponding function is displayed. When five or more functions are provided in the controller unit 200, the right arrow tab 505 is displayed, and when the right arrow tab 505 is pressed, a screen for another function is displayed. FIG. 5 shows an initial screen of a copy function when the touch key of the copy tab 501 has been pressed.

Display related to the copy function is performed in an area 506, and from the top of the area 506, in an area where "Ready to copy." is being displayed, a status to be displayed with the copy function is displayed, and in an area below, a magnification, a selected paper tray, and an apparatus number are displayed. Also, as touch keys for setting the operation mode of the copy function, an equal magnification key, a magnification key, a select paper key, a sorter key, a duplex key, an interrupt key, a text key, a left arrow key for reducing density, a right arrow key for increasing density, and an auto key that automatically adjusts density are displayed. Also, a designation screen of an operation mode that cannot be completely displayed in the initial screen is displayed hierarchically in the area 506 by pressing an application mode key.

The display area 507 is an area that displays the status of the MFP 101, and displays, for example, an alarm message regarding a jam or the like, or a status message that indicates that PDL printing is being performed when PDL printing is being performed. A system status/stop touch key 508 is displayed in the display area 507, and when the system status/stop touch key 508 is pressed, a screen displaying device information of the MFP 101 or a screen displaying a print job status is displayed. In this screen, it is possible to stop a job.

When the send/FAX tab 502 is pressed, a setting screen is displayed for sending by electronic mail or FTP, or by facsimile using the public communications line 108, an image that has been read by the MFP 101 to a device connected to the LAN 106. When the box tab 503 is pressed, the following sort of screen is displayed. That is, a setting screen is displayed for saving an image that has been read in the MFP 101 in the box area in the HDD 204, designating and printing the image data saved in the box area, and sending that image data to a device on the LAN 106.

First Embodiment

Control Configuration

Figure 6:
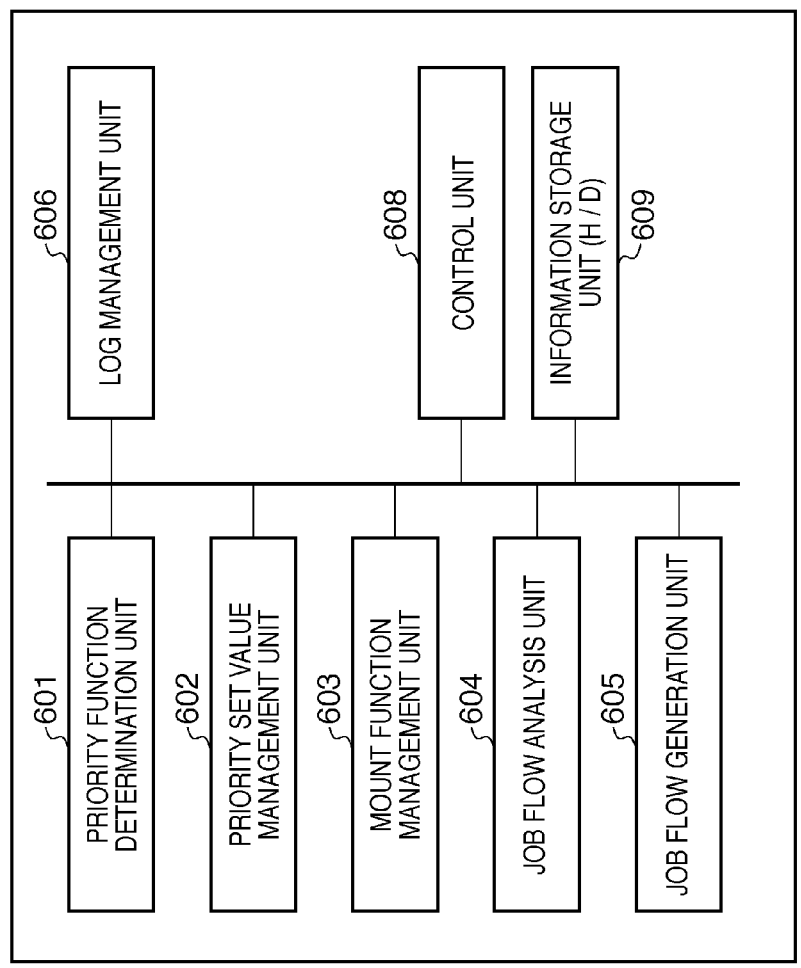
FIG. 6 shows a control configuration of the MFP 101 according to a first embodiment.

Next is a description of a first embodiment according to the present invention, with reference to FIGS. 6 to 12. First, a control configuration according to the present embodiment will be described with reference to FIG. 6. Control blocks shown in FIG. 6 are realized by the CPU 201 opening in the RAM 202 and executing programs stored in the ROM 203, the HDD 204, and so forth. The As control configurations, the MFP 101 is provided with a priority function determination unit 601, a priority set value management unit 602, a mount function management unit 603, a job flow analysis unit 604, a job flow generation unit 605, a log management unit 606, a control unit 608, and an information storage unit 609. In the description below, an example is given of a case when process executed by the MFP 101 and process executed by the client computer 105 are defined in a job flow. However, this is not a limitation of the present invention; the present invention is applicable if the job flow is executed in an apparatus included in the image processing system 100.

The priority function determination unit 601 determines whether or not to use a mount function of the MFP 101 from job flow information analyzed by the job flow analysis unit 604, with respect to process defined in the job flow. Here, the priority function determination unit 601 uses information managed by the priority set value management unit 602 and the mount function management unit 603. As a result of the determination, if rewriting of the job flow is necessary, a rewritten job flow is provided using the job flow generation unit 605.

The priority set value management unit 602 manages information that indicates whether to give priority to the MFP 101 or to the client computer 105, for a set value set when executing process according to the job flow. The set value set when executing process according to the job flow is, for example, a set value for designating a scan function defined in the job flow. Here, with reference to FIG. 7, a description is given of scan set value information managed by the priority set value management unit 602 that functions as a priority information storing means. For example, scan set value information is managed in the following manner. In the case of a set value for color reading at a resolution of 600*600 (dpi), the set value indicates that an apparatus of a high priority numerical value (in FIG. 7, the MFP 101 for which the numerical value 1 has been set) executes that process with priority, that is, priority is given to the MFP 101. On the other hand, in the case of a set value for monochrome binary reading at a resolution of 200*200 (dpi), scan set value information is managed such that the client computer 105 executes that process with priority.

The mount function management unit 603 manages a function mounted on the MFP 101 that executes process according to the job flow. Examples of the function mounted on the MFP 101 are a function of image processing described in the job flow, and a sending function. Here, with reference to FIG. 8, a description is given of mount function management information 800 managed by the mount function management unit 603 that functions as a mount function storing means. The mount function management information 800 shown in FIG. 8 indicates that both the MFP 101 and the client computer 105 possess an OCR (character recognition) function. On the other hand, the mount function management information 800 indicates that only the client computer 105 possesses an OCR (form recognition) function. Also, the mount function management information 800 is updated by the mount function management unit 603 when a new function is added to the MFP 101 or the client computer 105.

The job flow analysis unit 604 analyzes job flow information, and obtains information of each job for process in order a job flow in which a plurality of jobs have been defined as process. Here, with reference to FIG. 9, a description will be given of an example of a job flow 900. The job flow 900 includes job settings (job) 901, 902, and 903 for respective process. The job setting 901 indicates a setting related to scan execution in the MFP 101. The job setting 902 indicates a setting related to OCR (character recognition) execution in the client computer 105. The job setting 903 indicates a setting related to sending to a file server in the client computer 105. The job flow analysis unit 604, as a result of analysis, obtains information related to respective jobs in the job settings 901, 902, and 903, and provides this information such that process can be performed in order.

The job flow generation unit 605 generates a job flow when a determination has been made that it is necessary to create a job flow in the priority function determination unit 601. Here, with reference to FIG. 9, a description will be given of a job flow 1000 generated according to the job flow 900 by the job flow generation unit 605. In the job flow 1000, double lines in job settings (job) 1002 and 1003 indicate that they have been deleted. That is, in the job flow 1000, it is indicated that a job setting 1001 related to scan execution in the MFP 101 is effective, and the job setting 1002 for OCR (character recognition) execution in the client computer 105 and the job setting 1003 related to sending to a file server are not effective.

The log management unit 606 manages execution history information (log information) with respect to executed jobs.

Here, an example of log information 1100 will be described with reference to FIG. 10. The log information 1100 includes information related to a job flow ID, content of executed jobs (functions), settings content of executed jobs, execution date, execution user, and the apparatus that executed the job (apparatus ID).

The control unit 608 performs central control of the control described above, and for example, manages and calls various functions. The information storage unit (memory/HDD) 609 is configured like the HDD 204, and is a database for holding necessary information.

Job Flow Generation (Editing) Process

Figure 11A:
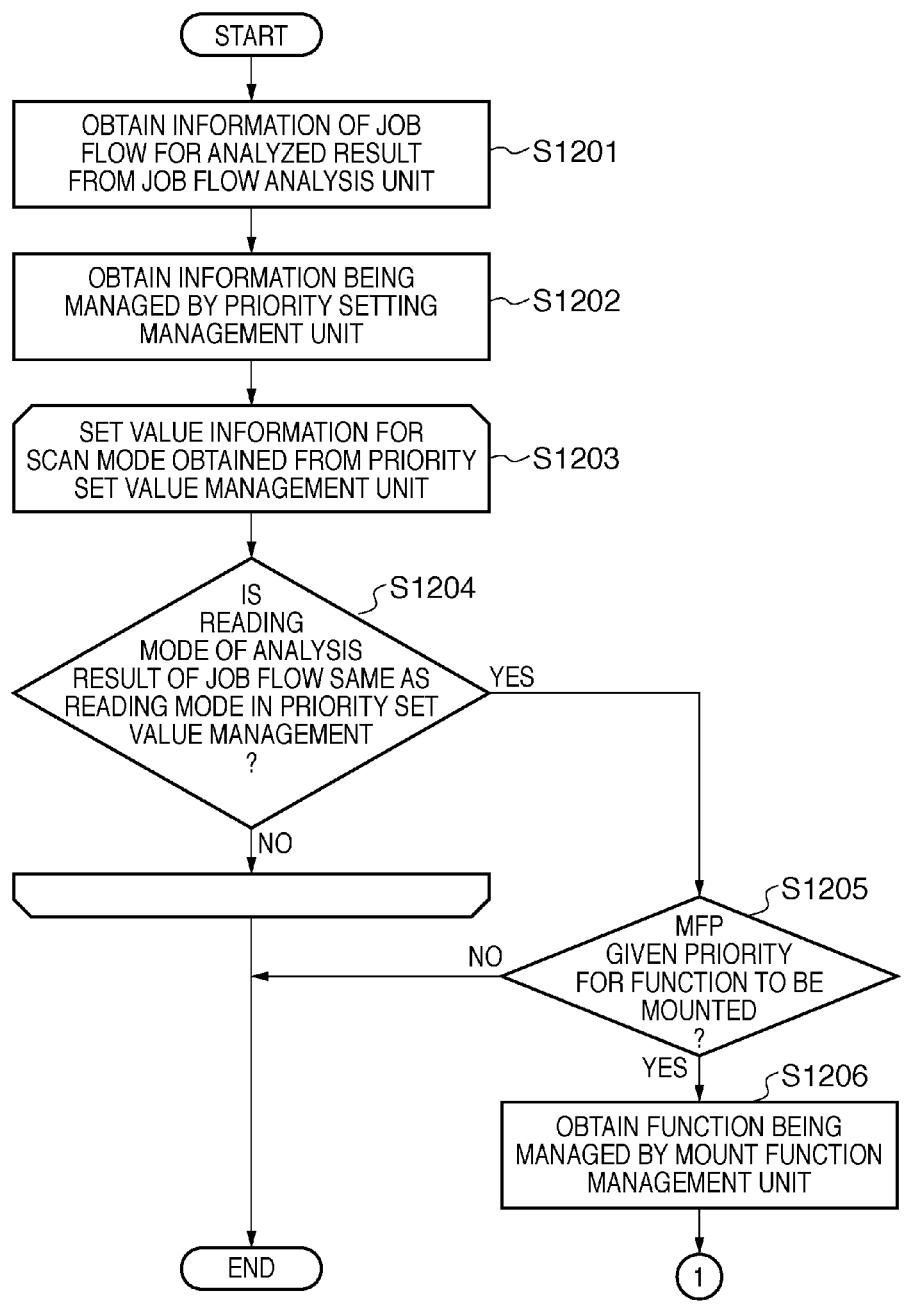
FIGS. 11A and 11B are flowcharts that show a procedure of job flow generation process according to the first embodiment.
Figure 11B:
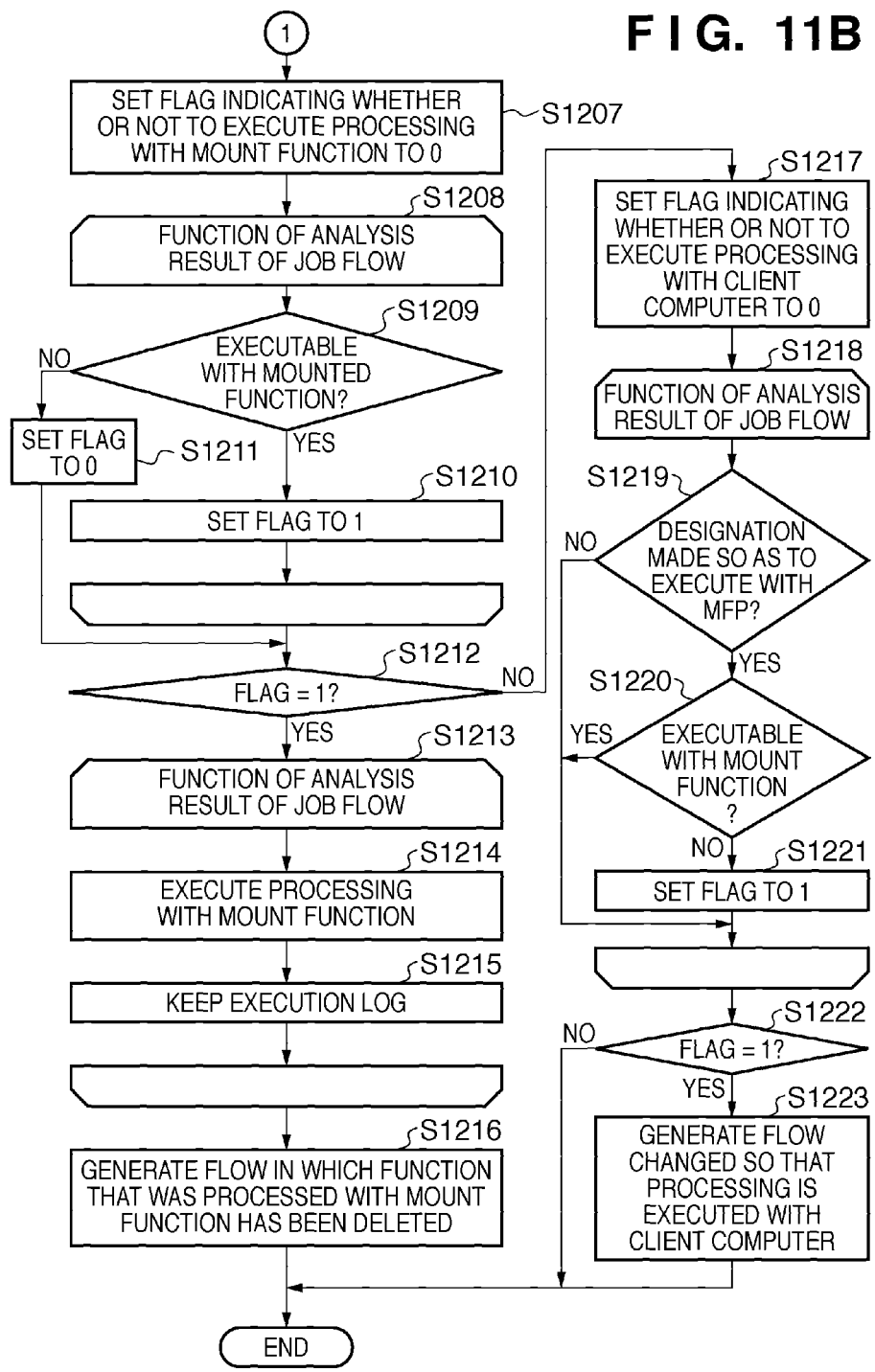

Next is a description of the procedure of job flow generation process, with reference to FIGS. 11A and 11B. This process is an example of priority function determination process of the present invention.

The process described below is centrally controlled by the control unit 608 that is realized by the CPU 201 reading out and executing a program from the ROM 203 or the HDD 204. Also, the process described below is started by the control unit 608 calling the priority function determination unit 601.

Figure 9:
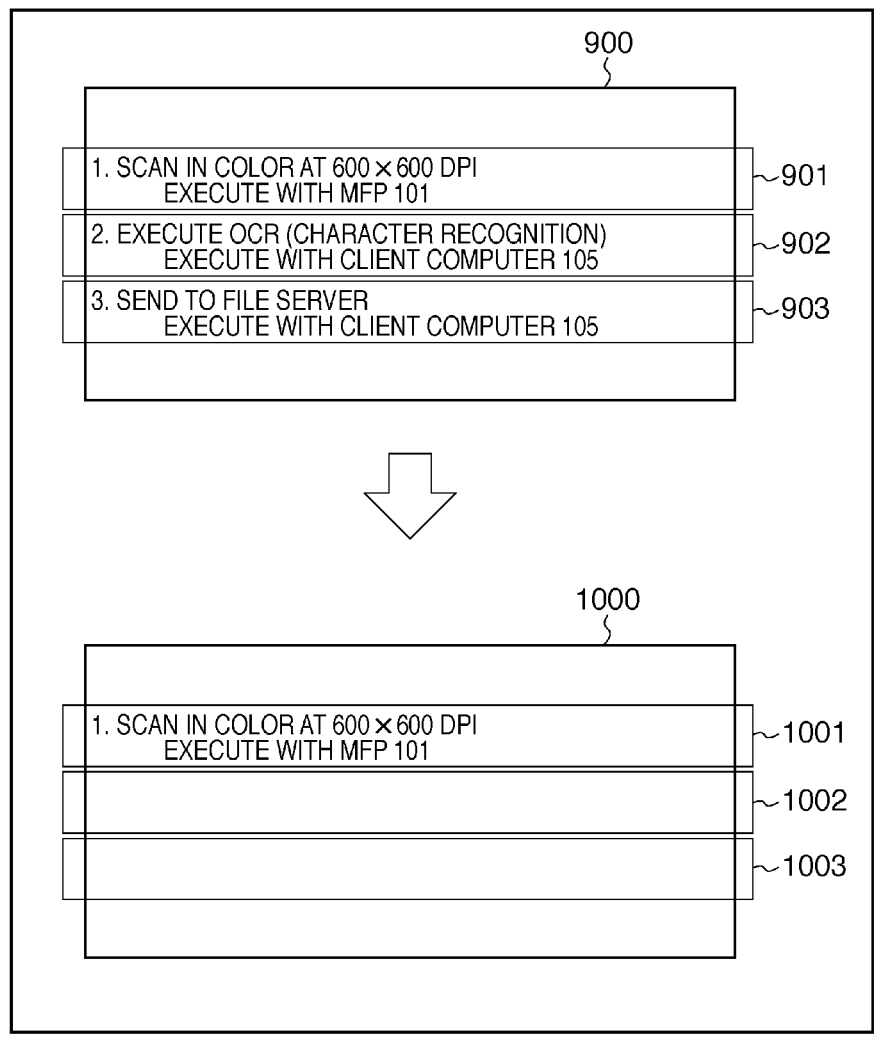
FIG. 9 shows an example of job flows 900 and 1000 according to the first embodiment.

In step S1201, the control unit 608 transfers a specified job flow to the job flow analysis unit 604, and obtains information related to the result of job flow analysis. The job flow analysis result information is information whereby the process of each process job can be performed in order, and for example, information for each of the respective executable jobs of job settings 901, 902, and 903 shown in FIG. 9 is obtained as analysis results. In step S1202, the control unit 608 obtains the information managed by the priority set value management unit 602 shown in FIG. 7. By way of example, FIG. 7 shows data when the priority set value management unit 602 holds set values related to the apparatus given priority by the scan mode designated when executing a scan execution job.

Next, in step S1203, the control unit 608 repeatedly performs process for the determination in step S1204 described below, for the number of items of data obtained in step S1202. In step S1204, the control unit 608 determines whether or not the execution function designated in the executed job of the analysis result is scan execution, and whether or not the analyzed reading mode matches the information of the set value of the scan mode. Here, during the repeated process, if the analyzed reading mode does not match the information of the set value of the scan mode, the control unit 608 ends process. On the other hand, if the analyzed reading mode matches the information of the set value of the scan mode, process advances to step S1205, where the control unit 608 determines whether or not the set value of the scan mode is a set value that gives priority to the MFP 101, or a set value that gives priority to the client computer 105.

Here, if the set value of the scan mode is a set value that gives priority to the client computer 105, the control unit 608 ends process. On the other hand, if the set value of the scan mode is a set value that gives priority to the MFP 101, process advances to step S1206.

In step S1206, the control unit 608 obtains the mount function information managed by the mount function management unit 603. The information managed by the mount function management unit 603 is information related to the function mounted in the MFP 101 or the client computer 105. Next, in step S1207, the control unit 608 prepares a flag for work for determining whether or not to execute process with the mount function of the MFP 101, and sets the flag to 0. In step S1208, process is performed that repeats the processing of steps S1209 and S1210 described below, for the number of items of analysis results of analyzing information of executable job units obtained in step S1201. When the repeated process ends, process advances to step S1212.

In step S1209, the control unit 608 determines whether or not the job unit information is executable, using the mount function information of the MFP 101 obtained in step S1206. If the job unit information is executable, process advances to step S1210, and if the job unit information is not executable, process advances to step S1211. In step S1210, the control unit 608 sets the work flag to 1, and continues the repeated process. On the other hand, in step S1211, the control unit 608 sets the work flag to 0, and advances to step S1212.

In step S1212, the control unit 608 determines whether or not the work flag has been set to 1. Specifically, here a determination is made of whether or not process is possible with the mount function of the MFP 101. If process is possible with the mount function of the MFP 101, process advances to step S1213, and if process is not possible with the mount function of the MFP 101, process advances to step S1217.

In step S1213, process is performed that repeats the process of steps S1214 and S1215 described below, for the number of items of analysis results of analyzing information of executable job units obtained in step S1201. In step S1214, the control unit 608 executes process with the mount function of the MFP 101, with respect to the target job. Next, in step S1215, the control unit 608 saves information of the log history related to the executed job by calling the log management unit 606.

In step S1216, the control unit 608 transfers the job flow analyzed in step S1201 to the job flow generation unit 605, and causes new generation of a job flow after execution by the mount function of the MFP 101, and then ends process. For example, the job flow generation unit 605 generates a new job flow in which the job that was executed by the MFP 101 has been deleted from among the jobs that were defined in the job flow.

On the other hand, in step S1217, the control unit 608 prepares a flag for work for determining whether or not to execute process with the client computer 105, and sets the flag to 0. Then, process advances to step S1218. In step S1218, process is performed that repeats the process of steps S1219 to S1221 described below, for the number of items of analysis results of analyzing information of executable job units obtained in step S1201. In step S1219, the control unit 608 determines whether or not there has been a designation to execute process with the MFP 101, with respect to the target job. Here, if execution of process with the MFP 101 has not been set, process returns to step S1218. On the other hand, if execution of process with the MFP 101 has been set, process advances to step S1220. In step S1220, the control unit 608 determines whether or not the target job is executable with the client computer 105, using the mount function information obtained in step S1206.

Here, if the target job is not executable with the client computer 105, process advances to step S1221, and if the target job is executable with the client computer 105, process returns to step S1218. In step S1221, the control unit 608 sets the work flag that was set to 0 in step S1217 to 1.

Figure 12:
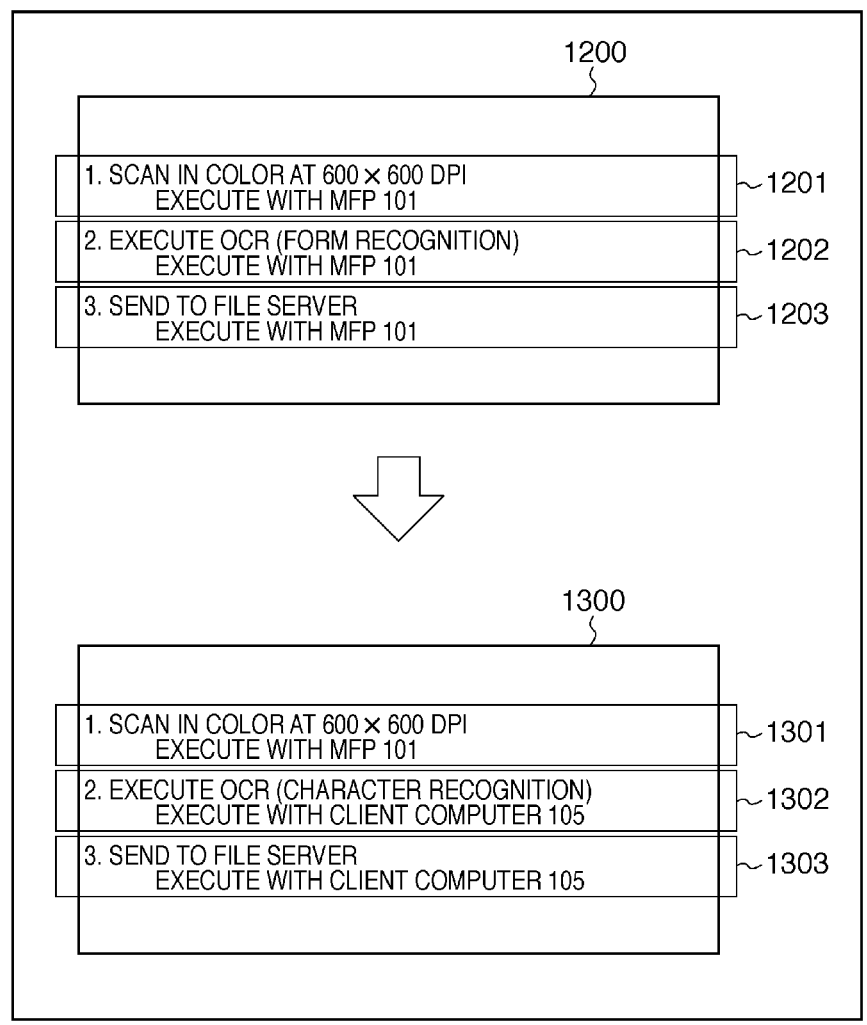
FIG. 12 shows an example of job flows 1200 and 1300 according to the first embodiment.

When the repeated process in step S1218 ends, in step S1222, the control unit 608 determines whether or not the work flag is set to 1, and determines whether or not the job flow is a job flow in which process is executed with the client computer 105. Here, if determined that the job flow is a job flow in which process is executed with the client computer 105, process advances to step S1223, and if determined that the job flow is a job flow in which process is not executed with the client computer 105, process ends. In step S1223, the control unit 608 transfers the job flow analyzed in step S1201 to the job flow generation unit 605, causes new generation of a job flow that designates execution by the client computer 105, and ends process. FIG. 12 shows a new job flow generated by the job flow generation unit 605. Reference number 1200 denotes an example of the job flow analyzed in step S1201. Reference number 1300 denotes an example of the job flow after the job flow 1200 has been changed in step S1223. As shown in FIG. 12, the job flow 1200 is defined such that all jobs 1201 to 1203 are executed by the MFP 101. However, the job flow generation unit 605 generates the job flow 1300 in which the job flow has been changed such that jobs 1302 and 1303 are executed by the client computer 105, but not a job 1301 that was actually executed by the MFP 101.

Job Flow Application Example and Application Results

Here, a description is given of an example operation when the job flow 900 is applied to the above-described flowchart shown in FIGS. 11A and 11B. The job flow 900 includes the job 901 executed by the MFP 101, and the jobs 902 and 903 executed by the client computer 105.

Based on the information obtained in steps S1201 and S1202, as a result of the determination in step S1204, process advances to step S1205. Also, as a result of the determination in step S1205, process advances to step S1206. Then, based on the information obtained in step S1206, as a result of the determination in step S1209, process advances to step S1210, a determination is made that execution is possible with the mount function, and the process of steps S1214 and S1215 is performed. Next, the process of step S1216 is performed.

Thus, according to the present embodiment, the job flow is changed from the designation of the jobs 902 and 903 executed by the client computer 105, so that jobs executable by the MFP 101 are executed by the MFP 101. Also, because of execution by the MFP 101, as shown in the job flow 1000 in FIG. 9, a job flow is generated in which jobs 1002 and 1003 performed by substitution have been deleted.

For example, it is assumed that when the job flow 900 has been created, the MFP 101 does not have an OCR (character recognition) function and a file server send function, and the job flow was created such that execution is performed by the client computer 105. Afterward, when the above two functions have been added to the MFP 101, by executing the priority function determination process according to the present embodiment, the user can execute the added functions with the MFP 101 without re-editing the job flow.

Also, a description is given of an example operation when the job flow 1200 is applied to the above-described flowchart shown in FIGS. 11A and 11B. The job flow 1200 includes the jobs 1201, 1202, and 1203 executed by the MFP 101.

Based on the information obtained in steps S1201 and S1202, as a result of the determination in step S1204, process advances to step S1205. Also, as a result of the determination in step S1205, process advances to step S1206. Then, based on the information obtained in step S1206, as a result of the determination in step S1209, process advances to step S1211. Afterward, in steps S1219 and S1220, a determination is made that the job 1202 cannot be executed with the mount function of the MFP 101, and the process of step S1223 is executed. In step S1223, the job flow 1300 is generated such that execution is possible with the client computer 105.

As described above, the image processing apparatus according to the present embodiment executes a job flow in an optimized manner, using priority information that indicates the priority of apparatuses that execute the respective process in the job flow, and mount function information that indicates the function mounted by each apparatus. Thus, with the image processing apparatus according to the present embodiment, by using the functions added to the MFP 101, it is possible to obtain the same effects as the process designated in the job flow without requiring the user to re-edit the job flow. Also, without requiring the user to re-edit the job flow, by using the jobs of the client computer 105, it is possible to obtain the same effects as the process designated in the job flow. Accordingly, with the present image processing apparatus, it is possible to save the time and effort of a user editing the job flow, and possible to provide a user-friendly operating system.

Note that, in the above flowcharts of FIGS. 11A and 11B, the job flow generation unit 605 generates, in step S1216, a new job flow in which the job that was executed by the MFP 101 has been deleted from among the jobs that were defined in the job flow, however, the job flow generation unit 605 may generate a new job flow using another method. That is, the job flow generation unit 605 may generate a new job flow so that another apparatus does not execute jobs that have been executed by the MFP 101. For example, job flow generation unit 605 may set a processed flag or an unprocessed flag for each job defined in the job flow.

Also, in the above flowcharts of FIGS. 11A and 11B, the MFP 101 also executes a final transmitting process (a process transmitting to the file server) in the job flow of FIG. 9. However, even if the MFP 101 can execute the final transmitting process, a predetermined apparatus (for example, the client computer 105) may execute the process. That is, in the job flow of FIG. 9, if possible, the MFP 101 executes the OCR process, and then, the job flow generation unit 605 the new job flow so that the client computer 105 does not execute the OCR process. The MFP 101 may transmit the scan data with the new job flow to the client computer 105. In that case, the client computer 105 transmits a received scan data to the file server defined in the new job flow.

Second Embodiment

Figure 13:
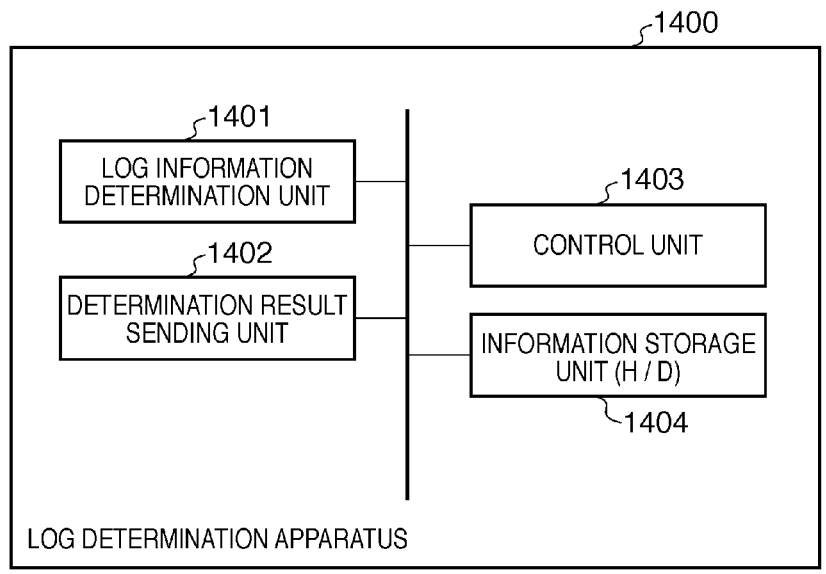
FIG. 13 shows a log information determination apparatus 1400 according to a second embodiment.
Figure 14:
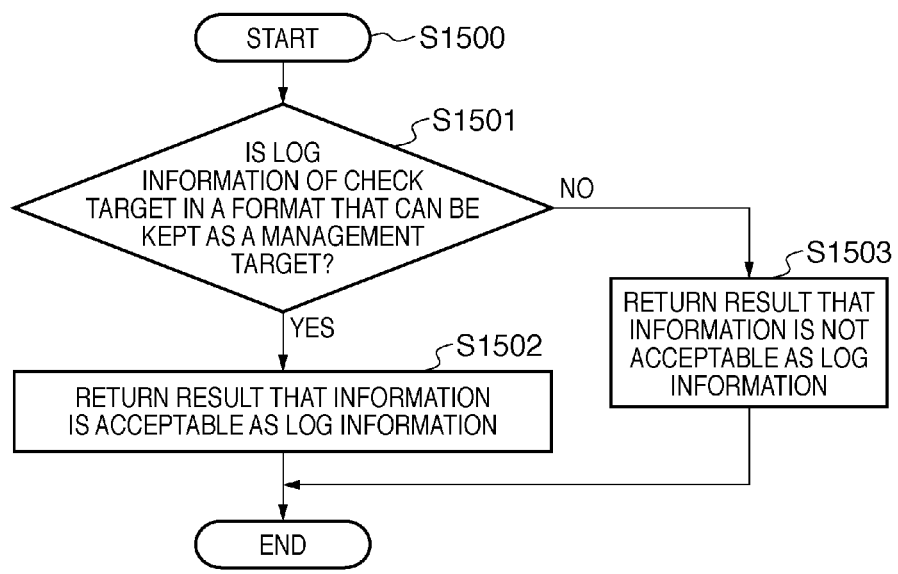
FIG. 14 is a flowchart that shows a procedure of log determination process according to the second embodiment.

Next is a description of a second embodiment, with reference to FIGS. 13 and 14. As shown in FIG. 13, a client computer 105 in this embodiment includes a log determination apparatus 1400 providing a log information determination function. The log information determination function performs process to check a function of managing a log, as preprocessing of the above-described priority function determination unit 601.

In the present embodiment, a function is provided that checks whether or not a log output as a result of execution of switching (generation) of a job flow can be accepted as log information managed in the client computer 105 designated in the job flow. When indicated in the determination result received from the client computer 105 that the log cannot be accepted, a determination is made that the operating environment is one in which the job flow is being strictly executed by the client computer 105. In this case, the MFP 101 executes process according to the job flow without executing the priority function determination process. On the other hand, when the log can be accepted in the client computer 105, the MFP 101 executes the priority function determination process.

As shown in FIG. 13, the log determination apparatus 1400 is provided with a log information determination unit 1401, a determination result sending unit 1402, a control unit 1403, and an information storage unit 1404. The log information determination unit 1401 determines whether or not log information output from the MFP 101 can be accepted as log information managed in the client computer 105. Also, the log information determination unit 1401 starts execution as check process performed before designation of the execution target job flow. That is, the MFP 101 obtains the log information determination result by sending part of the information managed by the log management unit 606 to the client computer 105 prior to executing the priority function determination process. The determination result sending unit 1402 sends the determination result in the log information determination unit 1401 to the MFP 101. The control unit 1403 performs centralized control of the process of the log determination apparatus 1400. The information storage unit 1404 is configured with a RAM, a RAM, an HDD, or the like, and saves a program of process executed by the control unit 1403, setting information, and so forth.

Log Information Determination

Next is a description of log information determination process in which log information to be checked is transferred, and a determination is made of whether or not this log information can be managed in the client computer 105, with reference to FIG. 14. The process in the below description is centrally controlled by the control unit 1403. The process in the flowchart shown in FIG. 14 is started by the control unit 1403 calling the log information determination unit 1401. The log information specified as the determination target is the log information managed in the log management unit 606.

In step S1501, the control unit 1403 makes a determination of whether or not the log information sent from the MFP 101 is in a format that can be kept as a management target. Here, the log information sent from the MFP 101 corresponds to log information output when process has been executed according to a job flow to be executed. The basis for making a determination includes a determination basis for determining that management is not possible if there is not an item that completely matches an item already being managed as log information. That is, the determination basis is such that management is deemed possible if among log management targets, there is an entry for any item in the log. Here, when determined that management is possible, process proceeds to step S1502, and when determined that management is not possible, process proceeds to step S1503.

In step S1502, the control unit 1403 calls the determination result sending unit 1402 to send a message indicating that management as log information is possible to the MFP 101, and then ends process. In step S1503, the control unit 1403 calls the determination result sending unit 1402 to send a message indicating that management as log information is not possible to the MFP 101, and then ends process. Then, in the MFP 101, when the received log information determination result indicates that management is possible in the client computer 105, the priority function determination process is executed. On the other hand, when the received log information determination result indicates that management is not possible in the client computer 105, the MFP 101 executes the priority function determination process, that is, prohibits re-editing of the job flow and executes process according to the job flow.

As described above, the image processing apparatus (the MFP 101) according to the present embodiment obtains from an external apparatus (the client computer 105), serving as the cooperation target in a job flow, information regarding whether or not a log of the job flow can be managed in the external apparatus. Further, when the obtained information indicates that the log cannot be managed in the external apparatus, the image processing apparatus prohibits execution of the priority function determination process described in the first embodiment, that is, prohibits changing the job flow, and executes process according to the job flow. Thus, in the present embodiment, with respect to process executed by an external apparatus in a job flow to be executed, it is possible to easily prevent changing the apparatus that executes the process to be executed by the external apparatus.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-006229 filed on Jan. 14, 2010 and 2010-291131 filed Dec. 27, 2010, which are hereby incorporated by reference herein in their entirety.

The invention claimed is:

1. An image processing apparatus for executing a job in cooperation with an external apparatus, according to a job flow in which a plurality of processes have been defined, the image processing apparatus comprising a processor that implements:
    a determination unit configured to determine whether or not the image processing apparatus can execute a process, among the processes defined in the job flow to be executed, which is designated to be executed by the external apparatus;
    an execution unit configured to execute the process which is designated to be executed by the external apparatus in response to determining that the image processing apparatus can execute the process;
    a generation unit configured to generate a job flow changed so that the external apparatus does not execute processes, among the processes defined in the job flow to be executed, which have been executed by the execution unit;
    a log management unit configured to manage an execution result by the execution unit as log information;
    a confirm unit configured to confirm whether or not the external apparatus can manage the log information managed by the log management unit, as an execution result of a process executed by the external apparatus; and
    a control unit configured to control the image processing apparatus to not execute the process even if the determination unit has determined that the image processing apparatus can execute the process in a case where the confirm unit has confirmed that the external apparatus cannot manage the log information managed by the log management unit, as an execution result of a process executed by the external apparatus.

2. The image processing apparatus according to claim 1, further comprising a priority information management unit configured to manage priority information indicating that each process is preferentially executed by the external apparatus or the image processing apparatus, wherein the execution unit executes the process in response to determining that the image processing apparatus can execute the process and the priority information has indicated that the process is preferentially executed by the image processing apparatus.

3. The image processing apparatus according to claim 1, further comprising a mount function management unit configured to manage a function which the image process apparatus has,
wherein the determination unit determines whether or not the image processing apparatus can execute the process, among of the processes defined in the job flow to be executed, which is designated to be executed by the external apparatus, based on information managed by the mount function management unit.

4. The image processing apparatus according to claim 3, further comprising an update unit configured to update information managed by the mount function management unit in a case where a new function has been added to the image processing apparatus.

5. The image processing apparatus according to claim 1, further comprising a reading unit configured to read an image of an original and generate image data.

6. A method for controlling an image processing apparatus executing a job in cooperation with an external apparatus, according to a job flow in which a plurality of processes have been defined, the method comprising:
determining whether or not the image processing apparatus can execute a process, among the processes defined in the job flow to be executed, which is designated to be executed by the external apparatus;
executing the process which is designated to be executed by the external apparatus in response to determining that the image processing apparatus can execute the process;
generating a job flow changed so that the external apparatus does not execute processes, among the processes defined in the job flow to be executed, which have been executed by the executing;
managing a result of executing the process as log information;
confirming whether or not the external apparatus can manage the log information, as an execution result of a process executed by the external apparatus; and
controlling the image processing apparatus to not execute the process even if it is determined that the image processing apparatus can execute the process in a case where it is confirmed that the external apparatus cannot manage the log information, as an execution result of a process executed by the external apparatus.

7. A non-transitory computer-readable storage medium storing a computer program for causing a computer to execute a method for controlling an image processing apparatus executing a job in cooperation with an external apparatus, according to a job flow in which a plurality of processes have been defined, the method comprising:
determining whether or not the image processing apparatus can execute a process, among the processes defined in the job flow to be executed, which is designated to be executed by the external apparatus;
executing the process which is designated to be executed by the external apparatus in response to determining that the image processing apparatus can execute the process; and
generating a job flow changed so that the external apparatus does not execute processes, among the processes defined in the job flow to be executed, which have been executed by the executing;
managing a result of executing the process as log information;
confirming whether or not the external apparatus can manage the log information, as an execution result of a process executed by the external apparatus; and
controlling the image processing apparatus to not execute the process even if it is determined that the image processing apparatus can execute the process in a case where it is confirmed that the external apparatus cannot manage the log information, as an execution result of a process executed by the external apparatus.

* * * * *